United States Patent Office 3,321,479
Patented May 23, 1967

3,321,479
PREPARATION OF ORGANOLITHIUM AMINE COMPLEXES
Gert G. Eberhardt, Philadelphia, and Walter A. Butte, Jr., West Chester, Pa., assignors to Sun Oil Company, Philadelphia, Pa., a corporation of New Jersey
No Drawing. Filed Mar. 14, 1966, Ser. No. 533,821
27 Claims. (Cl. 260—268)

This application is a continuation-in-part of application Ser. No. 258,621, filed Feb. 14, 1963, now abandoned, which in turn was a continuation-in-part of application Ser. No. 202,678, filed June 15, 1962, and now abandoned, which described and claimed the use of organolithium amine complexes of the type herein concerned as catalysts for telomerizing ethylene with aromatic hydrocarbons. The subject matter of said application Ser. No. 202,678 was incorporated into application Ser. No. 324,871, filed Nov. 19, 1963, as a continuation-in-part thereof and the application is now issued as U. S. Patent No. 3,206,519.

This invention relates to the preparation of organolithium products which are complexes between certain types of organolithium compounds and certain types of non-aromatic tertiary amines. These complexes are useful as telomerization catalysts and as intermediates for making various types of organic compounds.

Procedures are known in the prior art whereby organolithium compounds in which lithium is attached to an alkyl group can be prepared. For example, butyllithium can readily be prepared by reacting butyl chloride with metallic lithium. Likewise phenyl lithium can be prepared by reacting bromobenzene with metallic lithium. On the other hand, attempts to prepare organolithium compounds in which the lithium atom is attached either to an alkenyl group at an allylic position or to an alkaryl group at a benzylic position have not been particularly successful.

The present invention provides a procedure for preparing various types of organolithium compounds including compounds in which the lithium is located at an allylic position of an alkenyl group or at a benzylic position of an alkaryl group. Also compounds in which the lithium is attached directly to an aryl nucleus can be produced according to the invention. All of these compounds as obtained in the present process are in the form of a complex with a non-aromatic tertiary amine. However these complexes will undergo reactions in the same manner as would the corresponding organolithium compounds uncomplexed with an amine; and hence they can be used in a manner analogous to the use of Grignard reagents to produce various products such as acids, alcohols and ketones. The complexes formed in the present process are especially useful as catalysts for effecting various reactions, e.g., the telomerization of ethylene with aromatic hydrocarbons.

According to the invention organolithium amine complexes are formed by admixing a hydrocarbon which contains either allylic hydrogen, benzylic hydrogen or aromatic hydrogen with a non-aromatic tertiary amine of the hereinafter specified types in combination with LiR in which R is an alkyl or cycloalkyl group having 1–30 carbon atoms or in which R is the phenyl group. In other words LiR can be a lithium alkyl or cycloalkyl or it can be phenyl lithium. As a result of mixing the three components, reactions take place whereby the LiR first forms a complex with the tertiary amine and then a transmetallation of the lithium occurs from the resulting complex to the hydrocarbon. This forms a new organolithium compound which likewise complexes with the tertiary amine. The complexes obtained in this manner generally have a yellow color. These materials may or may not be substantially insoluble in hydrocarbons depending upon the size of the alkyl groups in the amine used in the reaction. When the alkyl groups are relatively small, the complexes will precipitate from the reaction mixture in the form of crystals as they are produced. The precipitate can readily be separated from the reaction mixture by filtration or decantation of the supernatent liquid.

The hydrocarbons used as starting material for the present process are characterized by having at least one hydrogen atom which is allylic, benzylic or aromatic. By "allylic hydrogen" is meant hydrogen atoms directly attached to a non-aromatic carbon atom which is alpha to an olefinic double bond. Thus in pentene-2 the two hydrogen atoms at the 4-position as well as the three hydrogen atoms at the 1-position are allylic. Likewise in β-methylstyrene the hydrogen atoms of the terminal methyl group are allylic. By "benzylic hydrogen" is meant hydrogen atoms directly attached to a carbon atom which in turn is directly attached to an aromatic nucleus. Thus the two hydrogen atoms which are on the alpha carbon atom of ethylbenzene are benzylic, as also are the four hydrogen atoms attached to the two-non-aromatic carbon atoms of acenaphthene.

Any hydrocarbons having allylic, benzylic or aromatic hydrogen, with the exceptions noted below, can be used in practicing the invention and will be converted in the process into an organolithium amine complex. One exception is that hydrocarbons having a conjugated terminal double bond should not be used. This exception applies regardless of whether the terminal double bond is in conjugation with another olefinic double bond or with an aromatic ring. Thus neither butadiene nor styrene should be used as the starting hydrocarbon. The use of such compounds would result in polymerization rather than the formation of the desired organolithium amine complexes. On the other hand, hydrocarbons having more than one olefinic double bond can be used provided that the double bonds are not in conjugation. Thus 1,4-hexadiene is a suitable starting material for making complexes according to the invention.

Other types of hydrocarbons that are excluded from use in practicing the invention are those having either an acetylenic or allenic group. Such hydrocarbons, even though they may contain allylic, benzylic or aromatic hydrogen, may tend to react in different ways than herein intended and hence are not embraced within the scope of the invention.

The following are examples of hydrocarbons containing allylic hydrogen that can be used in the process: propylene; butene-2; isobutylene; pentene-1; hexene-3; octenes; decenes; cetenes; cyclohexene; methylcyclopentenes; β-methylstyrene; 4-phenylbutene-1; 2-butenylspiro[5.5]undecane; and 2-butenyl[4.4.0]bicyclodecane. Operation of the process employing such hydrocarbons results in formation of organolithium amine complexes in which the lithium is attached to the hydrocarbon portion in the place of allylic hydrogen. Examples of hydrocarbons containing benzylic hydrogen are: toluene; xylenes; mesitylene; cymene; ethylbenzene; dodecylbenzene; methylnaphthalenes; dimethylnaphthalenes; acenaphthene, indane; dimethylpyrene; 14-p-tolylbicyclo[18.3.1]tetracosane; 2-tolylspiro[5.5]undecane; p-cyclopentyltoluene; 6-phenyl-3a,7-methano-3aH-cyclopentacyclooctene; 2-tolylbicyclo[4.4.0]decane; 2 - (p-tolyl)-bicyclo[5.5.0]dodecane; and the like. Use of hydrocarbons of this type results in the lithium being attached at a benzylic position. In case a hydrocarbon is used which has neither allylic nor benzylic hydrogen but does contain aromatic hydrogen, the lithium becomes attached to the aromatic nucleus. This can also be true where the hydrocarbon contains a single benzylic hydrogen atom at a sterically hindered position. Examples of this type of starting material are: benzene; t-butylbenzene; 1-phenyl - 1,1 - dimethylbutane; naphthalene; anthracene; phenanthrene; 3-phenylspiro-[6.6]tridecane; 2-phenylbicyclo[4.4.0]decane; cyclopentylbenzene; cyclobutylbenzene; 2-phenylbicyclo[4.4.0]-decane; 3-phenylbicyclo[27.3.1]tritriacontane.

This invention can also be practiced using certain types of derivatives of the hydrocarbons described above. These are derivatives which are the same as the described hydrocarbons except that they have an N,N-dialkylamino or an alkoxy substituent or both. As in the case of the hydrocarbons, these derivatives must contain at least one hydrogen atom which is allylic, benzylic or aromatic. N,N-dialkylamino-substituted hydrocarbons and alkoxy-substituted hydrocarbons having one or more active hydrogen atoms of the foregoing kinds will react in the same way as the parent hydrocarbon would with LiR and the hereinafter specified non-aromatic tertiary amines to form complexes. The positions of the dialkylamino or alkoxy substituents are immaterial as long as the substituted hydrocarbon contains at least one of the specified types of hydrogen to provide an active site at which transmetallation can occur. Hence such derivatives can be considered as equivalent to the hydrocarbons for purposes of the invention. The following are examples of derivatives that can be used: methyl allyl ether; diallyl ether; allyl dimethylamine; 2-N,N-dimethylaminobutene-2; anisole; p-methylanisole; N,N-dimethylaniline; N,N-diethylaniline; p-methyl-N,N-dimethylaniline; 1-dimethylamino-2 - phenylethane; N,N - dimethylbenzylamine; o-methylphenylmethyl ether; 2-N,N-dimethylaminonaphthalene; 1-naphthyl methyl ether; and the like. When a derivative is employed that has the dialkyl amino group or the alkoxy group attached to an aromatic ring, the lithium tends to substitute on the ring at a position which is ortho to such group even though the staritng compound may have one or more substituent groups containing allylic or benzylic hydrogen.

Besides the hydrocarbon or derivatives as described above, the other two necessary components of the reaction mixture are a lithium alkyl or lithium phenyl and a non-aromatic tertiary amine. Any lithium alkyl or cycloalkyl in which the R group has from 1 to 30 carbon atoms can be used. The following are examples of suitable R groups for the LiR component: ethyl; propyl; isopropyl; n-butyl; isobutyl; tertiary butyl; n-amyl, isoamyl; n- or isooctyl; n- or isodecyl; lauryl; palmityl; stearyl; cerotyl; cyclopentyl; methylcyclohexyl; butylcyclohexyl; triethylcyclohexyl; cyclooctyl; cyclododecyl; decahydronaphthyl; dicyclohexyl; tricyclohexyl and the like.

The amine component of the catalyst system can be any non-aromatic tertiary amine which is a diamine or an amine containing bridgehead nitrogen. While any such amine in combination with LiR as above described will function in the described manner, certain kinds of amines within the class defined give best results and hence are preferred. Particularly good results are obtained with chelating diamines, i.e., diamines in which the two nitrogen atoms are so spaced in the molecule that the diamine can form a chelate with the lithium atom of the LiR component. Examples of chelating diamines which do not have any rings in their molecular structures are as follows: N,N,N',N'-tetramethylethylene; N,N,N',N'-tetraethylpropylene diamine; N,N,N',N'-tetrapropylethylene diamine, and N,N,N',N'-tetrahexylpropylene diamine. The following are examples of chelating diamines which contain one or more rings in the molecule: N,N,N',N'-tetraalkyl-1,2-diaminocyclohexane; N,N,N',N'-tetraalkyl-2,3-diaminodecalin; N,N,N',N'-tetraalkyl-1,8-diaminodecalin; N,N' - dialkylbispidin; 1,2 - bis(1-piperidyl)ethane; 1,3-bis(1-pyrrolidinyl)propane; and 1-methyl-2-dimethylaminomethylpiperidine.

Another preferred type of amine for use in practicing the invention comprises those non-aromatic tertiary amines in which one or more of the nitrogen atoms are at a bridgehead position, by which is meant that all three valences of the nitrogen participate in ring systems. The preferred amine of this type is triethylene diamine, which also can be designated 1,4-diaza[2.2.2]bicyclooctane, which has the following structure:

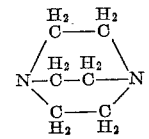

This bridgehead amine is non-chelating but it also will form a coordination complex with the LiR component which complex is particularly effective for the present purpose. Another amine of the bridgehead type is the monoamine, quinuclidine or 1,4-ethylene piperidine, which has a structure like the foregoing except that one of the nitrogen atoms is replaced by a CH group. Likewise 1-aza[2.2.1]bicycloheptane is an example of a bridgehead monoamine that can be used. Still other examples are the aza-adamantanes which structurally resemble adamantane except that one or more introgen atoms are substituted at bridgehead positions in place of carbon.

A particularly effective chelating diamine for use in practicing the invention is the alkaloid, sparteine, which has the formula

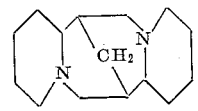

This compound is both a chelating and bridgehead diamine. When sparteine is used, the rate of transmetallation of the lithium to the hydrocarbon (or alkoxy-substituted or N,N-dialkylamino-substituted hydrocarbon) component of the reaction mixture occurs at an especially high rate and the desired complex product is obtained in minimum reaction time.

Non-aromatic tertiary diamines other than those which are chelating or of the bridgehead type as discussed above also can be used in practicing the invention although they generally give lower rates of transmetallation and hence require longer times for completion of the reaction. Examples of such other tertiary diamines that can be used are the following: N,N,N',N'-tetramethylmethylene diamine; N,N,N',N'-tetramethylhexamethylene diamine; N,N'-dimethylpiperazine; 1-methyl-3-dimethylaminopyrrolidine; 1-methyl-4 - dimethylaminopiperidine; and the like.

The reaction can be carried out merely by admixing the three reaction components at a temperature in the range of —20° C. to 180° C., more preferably 20 to 100° C. An inert atmosphere should be maintained in the reactor so as to exclude oxygen and moisture which otherwise would react with the organolithium compounds. The order of adding the components to the mixture is immaterial. Generally a large molar excess of the hydrocarbon component is used so that the hydrocarbon functions not only as a reactant but also as a solvent for the LiR and amine components. The ratio of the amine to the LiR compound should be high enough so that the atomic ratio of nitrogen to lithium (N:Li) is at least 1:1, and N:Li atomic ratios ranging up to as high as 100:1 can be employed. The use of an excess of the amine relative to the LiR compound is generally advantageous, as the rate of reaction is a function of the N:Li ratio and it increases as such ratio is increased. Hence the time required for completing the reaction can be effectively reduced by using a large excess of the amine. Also the rate of reaction is a function of temperature and thus the reaction time can be shortened by using higher temperatures in the range specified above.

When triethylene diamine is the amine used, the products obtained in most cases have low solubility in the hydrocarbons from which they are formed and hence they precipitate from the reaction mixture as yellow crystalline solids as the reaction proceeds. The same is true when non-bridgehead diamines having relatively small hydrocarbon groups are used. The hydrocarbon solubility of the organolithium complex products tends to increase as the size of the hydrocarbon groups in the amine employed is increased. Also, whether or not the complex is soluble depends considerably on the amount of excess non-aromatic tertiary amine used in the reaction mixture, as such amine generally will function as a solvent for the transmetallation product complex. In cases where the products have sufficient solubility to keep them in solution in the reaction mixture, they can be recovered therefrom after completion of the reaction by distilling off the excess hydrocarbon and amine under reduced pressure.

A more specific illustration of the invention can be shown by considering the reaction of toluene, lithium butyl and triethylene diamine. When these materials are admixed using a large excess of toluene to serve as solvent, the lithium butyl and the amine first form a coordination complex which can be represented as Butyl Li·Amine and which remains in solution in the toluene. This complex thereafter reacts with the toluene in the following manner:

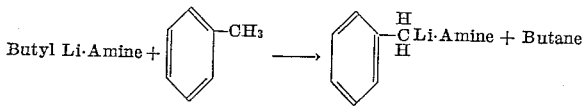

It can be seen that transmetallation occurs whereby the lithium atom replaces a hydrogen atom on the methyl group attached to the benzene ring and the newly formed lithium compound complexes with the amine. This new coordination complex is mainly insoluble in the toluene and accordingly precipitates in the form of yellow crystals as the reaction proceeds. The hydrogen atom displaced from the toluene combines with the butyl group to form butane which will vaporize from the mixture unless it is maintained under pressure. When this reaction is carried out at 30° C. using a triethylene diamine to lithium butyl molar ratio of 1:1 (atomic ratio of N:Li=2), only 15% conversion of the lithium to the new complex form is obtained in a reaction time of one hour. On the other hand, when such molar ratio is 3:1 (N:Li=6), the reaction at 30° C. is greatly expedited and about 90% conversion is obtained in one hour. By using a molar ratio of 8:1 (N:Li=16), a conversion of 90% can be obtained in about 17 minutes at this temperature. This illustrates the marked effect that excess amine has on reaction rate.

In the above reaction of toluene a minor amount of transmetallation of the lithium to the aromatic ring will also occur but such reaction is considerably less favored than transmetallation to the benzylic position and especially when the benzylic position is provided by a methyl group. For ethyl or higher substituents the benzylic position is not as highly favored so that transmetallation to the ring will occur to a somewhat larger degree. In the case of hydrocarbon reactants having allylic hydrogen, transmetallation of lithium to the allylic position generally will take place at roughly the same rate as to an aromatic hydrogen position.

Analyses of the crystalline products obtained by reacting the specific materials in accordance with the invention show that they are coordination complexes formed by transmetallation in the manner above indicated. The nitrogen and lithium contents correspond to a molar ratio of the organolithium moiety to the amine of 1:1. Hence, when a diamine is used for effecting the reaction with the hydrocarbon, the N:Li atomic ratio in the product is 2:1. Upon heating the product under vacuum, the complex can be slowly dissociated and the amine can be removed and recovered therefrom.

The examples described below, which were all carried out under a nitrogen atmosphere, are specific illustrations of the invention. In most of these examples the structure of the organolithium portion of the complexes obtained were determined by carbonating the product using powdered Dry Ice in ether. This converts the organolithium portion to the corresponding lithium salt of a carboxylic acid and releases the amine in accordance with the following equation:

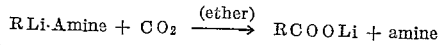

This is a conventional procedure for determining the exact product of a transmetallation reaction (see "Organic Reactions," vol. VI, pages 356–361, John Wiley and Sons, Inc., 1951). In the present examples the resulting carbonated mixtures were treated with dilute aqueous hydrochloric acid to convert the lithium salts to the corresponding acids which were soluble in the ether layer. The amine was extracted into the water layer in the form of its chloride salt and could be recovered therefrom in its original form by addition of caustic soda and extraction with ether. The carboxylic acid products were recovered from the ether layer by evaporating the solvent. The resulting acids were purified by crystallization from alcohol solution, and the purified compounds were identified by melting points and infrared spectra. In this manner the position at which metallation of the starting hydrocarbon (or substituted hydrocarbon) had occurred was ascertained.

*Example 1.—Preparation of phenyllithium complex*

A solution of 0.6 g. of butyllithium in 6 ml. of hexane was introduced into a reaction vessel to which had been added 1.1 g. of triethylene diamine dissolved in a mixture of 20 ml. of hexane and 10 ml. of benzene. The reaction mixture was maintained at room temperature under an atmosphere of nitrogen. After several hours a crystalline precipitate had separated from the mixture. Analysis of a sample of this precipitate showed an atomic ratio of N:Li of about 2:1, corresponding to a 1:1 molar ratio of triethylene diamine to the phenyllithium moiety. It melted with decomposition at 150° C. After carbonation of the product and purification by crystallization, it was identified by melting point and I.R. spectra as benzoic acid.

*Example 2.—Preparation of benzyllithium complex*

A solution of 0.6 g. of butyllithium in 6 ml. of hexane was added to a reactor containing 1.1 g. of triethylene diamine in 11 ml. of toluene. This corresponds to approximately equal molar amounts of the butyllithium and diamine reactants. The mixture was maintained at 50° C. for six hours by which time the reaction was essentially complete and all of the lithium had been carried out of solution in the form of a yellow crystalline complex. After carbonation and purification the product was identified as phenylacetic acid, showing that the lithium had reacted at the benzylic hydrogen position. The yield of the complex product, as determnied from the amount of phenylacetic acid obtained, was about 60% of theoretical based on the butyllithium added.

*Examples 3–5*

Three other runs were made under essentially the same conditions as shown in Example 2 except that in place of triethylene diamine the following diamines, respectively, were substituted in equivalent molar amounts: N,N,N′,N′ - tetramethylethylene diamine (TMEDA); N,N,N′,N′ - tetramethylbutane - 1,3 - diamine (TMBDA); and sparteine. In each case again the resulting complex precipitated as a yellow crystalline material. Upon carbonation and purification the product for each run was determined to be phenylacetic acid, showing that the lithium transmetallated to a benzylic position. Yields of the complex products, again determined from amounts of phenylacetic acid obtained, were as follows:

Diamine: Yield, percent of theoretical
TMEDA _____ 77
TMBDA _____ 60
Sparteine _____ 90

From these results it can be seen that all of these diamines are effective and that the fastest transmetallation rate is obtained with sparteine.

*Example 6.—Preparation of benzyllithium complex*

A solution of 0.6 g. butyllithium in 6 ml. of hexane was added to a reactor containing 1.2 g. N,N,N',N'-tetramethylethylene diamine (TMEDA) and 1.0 g. toluene. The mixture was kept at 50° C. for one hour and then was cooled to 0° C. A red oil separated which solidified upon standing to a crystalline solid, M.P. 73° C. Analysis showed that this solid contained benzyllithium and the amine in a 1:1 proportion. Carbonation of the solid in the usual manner provided phenylacetic acid, showing that the lithium was bound to the benzylic carbon atom in the complex. The amine was detected unchanged among the hydrolysis products.

*Example 7.—Preparation of complex from heptene-2*

Heptene-2 was reacted with butyllithium and triethylene diamine in the manner described in Example 2 using a temperature of 50° C. and a reaction time of 12 hours. The resulting yellow precipitate was carbonated to release the amine and substitute a carboxyl group in place of the lithium atom. The product so obtained was found to be 3-octenoic acid, thus showing that the lithium was substituted on the heptene-2 in place of terminal allylic hydrogen.

*Example 8.—Preparation of complex from anisole*

A reaction vessel was charged with 0.1 mole of anisole, 20 ml. of a 0.5 molar solution of triethylene diamine in hexane and 6 ml. of a 1.67 molar solution of butyllithium in hexane. The mixture was allowed to stand at room temperature overnight. Within less than one hour a yellow crystalline precipitate had formed. After carbonation the acid product formed was found to be o-methoxybenzoic acid. This shows that a methoxy group on an aromatic nucleus directs metallation of the nucleus to the ortho position.

*Example 9.—Preparation of complex from N,N-dimethylaniline*

Another run was made under the same conditions as in Example 8 except that N,N-dimethylaniline was substituted for anisole. The carbonated product was found to be o-dimethylaminobenzoic acid. This shows that a dialkylamino group also directs the metallation to the ortho position of a benzene ring.

*Examples 10 to 16*

A series of runs was made in the same manner as in Example 8 using various hydrocarbons or hydrocarbon derivatives as substrates. In all cases a yellow crystalline precipitate was obtained in less than one hour. The following table shows the substrate used and the acid product obtained upon carbonation.

| Run No. | Substrate Used | Acid Obtained |
| --- | --- | --- |
| 10 | m-Xylene | m-$CH_3C_6H_4CH_2COOH$ |
| 11 | p-Xylene | p-$CH_3C_6H_4CH_2COOH$ |
| 12 | Mesitylene | 3,5-$(CH_3)_2C_6H_3CH_2COOH$ |
| 13 | Naphthalene | Mixture of naphthoic acids. |
| 14 | α-Methylnaphthalene | 1-$C_{10}H_7CH_2COOH$ |
| 15 | β-Methylstyrene | $C_6H_5CH=CHCH_2COOH$ |
| 16 | p-Methylanisole | 3-$CH_3$-6-$CH_3O$-$C_6H_3COOH$ |

In each of these runs essentially complete conversion of the lithium to an organolithium amine complex of the substrate was obtained when the mixture stood at room temperature overnight.

*Example 17.—Transmetallation from phenyllithium complex*

Phenyllithium in the form of a complex with TMEDA was prepared by admixing equal molar amounts of benzene, butyllithium and TMEDA and allowing the mixture to react at 60° C. for 24 hours. After the reaction it was determined that 69% of the lithium had transmetallated to the benzene. This was done by reacting a small aliquot sample of the mixture with deuterium oxide and showing by mass spectra that 69% of the benzene in the resulting mixture was deuterated. The phenyllithium·TMEDA complex was then reacted at 60° C. for 24 hours with toluene in equimolar proportion based on the original reactants used. The extent of conversion of the phenyllithium to benzyllithium was determined as before by reacting the mixture with deuterium oxide and determining the amount of deuterated toluene obtained. It was found that the proportion of lithium in the form of the phenyllithium complex had decreased from 69% to 31% and that 49% of the lithium had formed the benzyllithium·TMEDA complex. This shows that phenyllithium can be used as the LiR component in practicing the invention.

*Example 18.—Preparation of allyllithium complex*

A 50-cc. stainless steel bomb was charged with 0.25 g. (0.039 mole) n-butyllithium in 10 cc. hexane, and 0.8 cc. of sparteine was added with a syringe. The reactor was closed and 5 g. of propylene were introduced. The reactor was then heated to 70° C. and shaken for 2 hours at this temperature, after which the excess propylene was vented. The transmetallation product complex was a solid having a faint yellow color in the form of a slurry with the hexane. For purposes of identification the product was converted to 9-allylfluoren-9-ol by first shaking the slurry with a solution of 0.59 g. fluorenone in 25 cc. hexane and then treating the mixture with dilute aqueous hydrochloric acid. The resulting alcohol was obtained from the hydrocarbon layer, while the sparteine was in the aqueous layer as its hydrochloride salt. Upon working up the hydrocarbon layer 0.66 g. (88% yield) of 9-allylfluoren-9-ol (M.P. 116.7–117° C.) was obtained. After one recrystallization from hexane the product had a melting point of 117–118° C. This compares with a literature value of 118° C. (Wittig et al., Ann., vol. 562, page 192 (1949)).

When any other lithium alkyl or cycloalkyl as herein defined is substituted for butyllithium or phenyllithium or when other non-aromatic tertiary diamines or bridgehead amines are substituted for the specific amines used in the foregoing examples, analogous reactions are obtained although in many cases slower rates of transmetallation may be experienced. Also, when the alkyl groups of the tertiary amine are sufficiently large, the complexes produced are more soluble in the substrate and precipitation thereof may not occur. In such cases the excess substrate and amine can be distilled under vacuum and the complex can be obtained as residuum.

The invention claimed is:
1. Method of preparing an organolithium amine complex which comprises admixing in liquid phase at a temperature in the range of −20° C. to 180° C. a compound selected from the group consisting of (1) hydrocarbons, (2) N,N-dialkylamino-substituted hydrocarbons and (3) alkoxy-substituted hydrocarbons, said compound being in liquid phase and containing at least one hydrogen atom of the class consisting of allylic hydrogen, benzylic hydrogen and aromatic hydrogen but being free of any conjugated terminal double bond, acetylenic bond or allenic bond, with a non-aromatic tertiary amine which is a diamine or an amine containing bridgehead nitrogen in combination with LiR wherein R is selected from the class consisting of alkyl and cycloalkyl groups having 1–30 carbon atoms and phenyl, and recovering from the reaction mixture an organolithium amine complex in which the organo portion corresponds to said compound.

2. Method according to claim 1 wherein said non-aromatic tertiary amine is a diamine.

3. Method according to claim 1 wherein said non-aromatic tertiary amine contains bridgehead nitrogen.

4. Method according to claim 3 wherein said amine is triethylene diamine.

5. Method according to claim 1 wherein the said compound is a hydrocarbon containing allylic hydrogen and said complex has a lithium atom attached at the allylic position.

6. Method according to claim 5 wherein said non-aromatic tertiary amine is a diamine.

7. Method according to claim 5 wherein said non-aromatic tertiary amine contains bridgehead nitrogen.

8. Method according to claim 7 wherein said amine is triethylene diamine.

9. Method according to claim 8 wherein LiR is n-butyllithium and said temperature is in the range of 20–100° C.

10. Method according to claim 1 wherein the said compound is a hydrocarbon containing benzylic hydrogen and said complex has a lithium atom attached at the benzylic position.

11. Method according to claim 10 wherein said non-aromatic tertiary amine is a diamine.

12. Method according to claim 10 wherein said non-aromatic tertiary amine contains bridgehead nitrogen.

13. Method according to claim 12 wherein said amine is triethylene diamine.

14. Method according to claim 13 wherein LiR is n-butyllithium and said temperature is in the arnge of 20–100° C.

15. Method according to claim 1 wherein the said compound is a hydrocarbon containing aromatic hydrogen and said complex has a lithium atom attached to the aromatic nucleus.

16. Method according to claim 15 wherein said non-aromatic tertiary amine is a diamine.

17. Method according to claim 15 wherein said non-aromatic tertiary amine contains bridgehead nitrogen.

18. Method according to claim 17 wherein said amine is triethylene diamine.

19. Method according to claim 18 wherein LiR is n-butyllithium and said temperature is in the range of 20–180° C.

20. Method according to claim 1 wherein an aromatic lithium amine complex is prepared by admixing at a temperature in the range of 20–100° C. benzene or an alkylbenzene having benzylic hydrogen in liquid phase with said non-aromatic tertiary amine in combination with LiR and recovering from the reaction mixture an aromatic lithium amine complex in which the lithium atom is attached to the benzene ring in the case of benzene or at a benzylic position in the case of alkylbenzene.

21. Method according to claim 20 wherein said amine is triethylene diamine and LiR is n-butyllithium.

22. Method according to claim 1 wherein an alkenyl lithinum amine complex is prepared by admixing at a temperature in the range of 20–100° C. an olefin hydrocarbon having allylic hydrogen in liquid phase with said non-aromatic tertiary amine in combination with LiR and recovering from the reaction mixture an alkenyl lithium amine complex in which the lithium atom is attached at an allylic position.

23. Method according to claim 22 wherein said amine is triethylene diamine and LiR is n-butyllithium.

24. Method according to claim 1 wherein an N,N-dialkylaminohydrocarbo lithium amine complex is prepared by admixing at a temperature in the range of 20–100° C. an N,N-dialkylamine-substituted hydrocarbon having aromatic, benzylic or allylic hydrogen in liquid phase with said non-aromatic tertiary amine in combination with LiR, and recovering from the reaction mixture said complex in which the lithium atom is attached at an aromatic, benzylic or allylic position.

25. Method according to claim 24 wherein said amine is triethylene diamine and LiR is n-butyllithium.

26. Method according to claim 1 wherein an alkoxyhydrocarbolithium amine complex is prepared by admixing at a temperature in the range of 20–100° C. an alkoxy-substituted hydrocarbon having aromatic, benzylic or allylic hydrogen in liquid phase with said non-aromatic tertiary amine in combination with LiR, and recovering from the reaction mixture said complex in which the lithium atom is attached at an aromatic, benzylic or allylic position.

27. Method according to claim 26 wherein said amine is triethylene diamine, and LiR is n-butyllithium.

No references cited.

ALEX MAZEL, *Primary Examiner.*

HENRY R. JILES, *Examiner.*

Notice of Adverse Decision in Interference

In Interference No. 96,535 involving Patent No. 3,321,479, G. G. Eberhardt and W. A. Butte, Jr., PREPARATION OF ORGANOLITHIUM AMINE COMPLEXES, final judgement adverse to the patentees was rendered Mar. 10, 1972, as to claims 1, 2, 5, 6, 10, 11, 15, 16, 20 and 22.

[*Official Gazette August 22, 1972.*]